(12) United States Patent
Terada et al.

(10) Patent No.: US 8,369,248 B2
(45) Date of Patent: Feb. 5, 2013

(54) INFORMATION TRANSMITTING AND RECEIVING SYSTEM, INFORMATION TRANSMITTING DEVICE, AND INFORMATION RECEIVING DEVICE

(75) Inventors: Tomoyuki Terada, Toyonaka (JP); Po-Chieh Hung, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 430 days.

(21) Appl. No.: 12/526,990

(22) PCT Filed: Dec. 27, 2007

(86) PCT No.: PCT/JP2007/075117
§ 371 (c)(1),
(2), (4) Date: Aug. 13, 2009

(87) PCT Pub. No.: WO2008/102515
PCT Pub. Date: Aug. 28, 2008

(65) Prior Publication Data
US 2010/0074149 A1 Mar. 25, 2010

(30) Foreign Application Priority Data
Feb. 23, 2007 (JP) .................................. 2007-043582

(51) Int. Cl.
*H04L 12/16* (2006.01)
(52) U.S. Cl. ................. 370/260; 348/14.01; 379/201.01
(58) Field of Classification Search .................. 370/260; 713/172; 725/31
See application file for complete search history.

(56) References Cited

U.S. PATENT DOCUMENTS

| | | | |
|---|---|---|---|
| 7,069,439 B1 * | 6/2006 | Chen et al. | 713/172 |
| 2004/0230990 A1 * | 11/2004 | Ikegami et al. | 725/31 |
| 2009/0055383 A1 * | 2/2009 | Zalewski | 707/5 |

FOREIGN PATENT DOCUMENTS

| | | | |
|---|---|---|---|
| JP | 3-196727 A | | 8/1991 |
| JP | 8-256145 A | | 10/1996 |
| JP | 2000-196546 A | | 7/2000 |
| JP | 2001-345767 A | | 12/2001 |
| JP | 2002-41461 A | | 2/2002 |
| JP | 2004-023379 | * | 6/2002 |
| JP | 2002-368707 A | | 12/2002 |
| JP | 2004-23379 A | | 1/2004 |
| JP | 2004-96495 A | | 3/2004 |
| JP | 2005-18487 A | | 1/2005 |
| WO | WO 2008/102515 A1 | | 8/2008 |

* cited by examiner

*Primary Examiner* — Dang Ton
*Assistant Examiner* — Lionel Preval
(74) *Attorney, Agent, or Firm* — Buchanan Ingersoll & Rooney PC

(57) ABSTRACT

An information transmitting and receiving system having an information transmitting device including: an information reading section; an information processing section which divides the information into a plurality of information segments, and gives an identifier uniquely to each divided information segment; and an information transmitting section which repeatedly transmits a bundle of identifiers in a first period of time, and an information receiving device including: an information receiving section which receives the identifiers; an information selecting section which selects an information segment desired to read; a display section which displays the information segment desired to read; and a display control section which controls the information display section such that if the information receiving section does not receive the identifier given to the information segment desired to read within a second period of time, stops displaying the information segment.

11 Claims, 12 Drawing Sheets

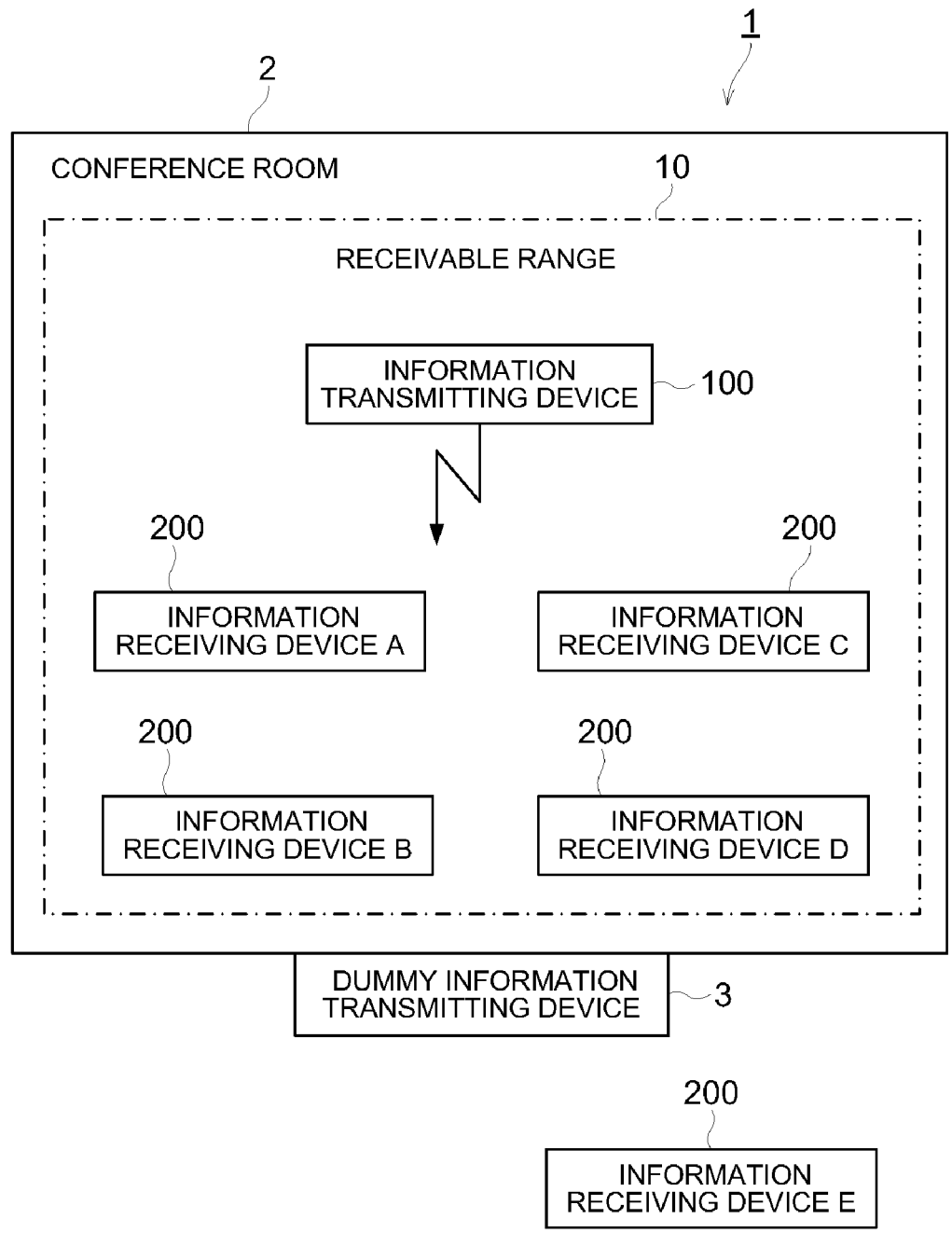

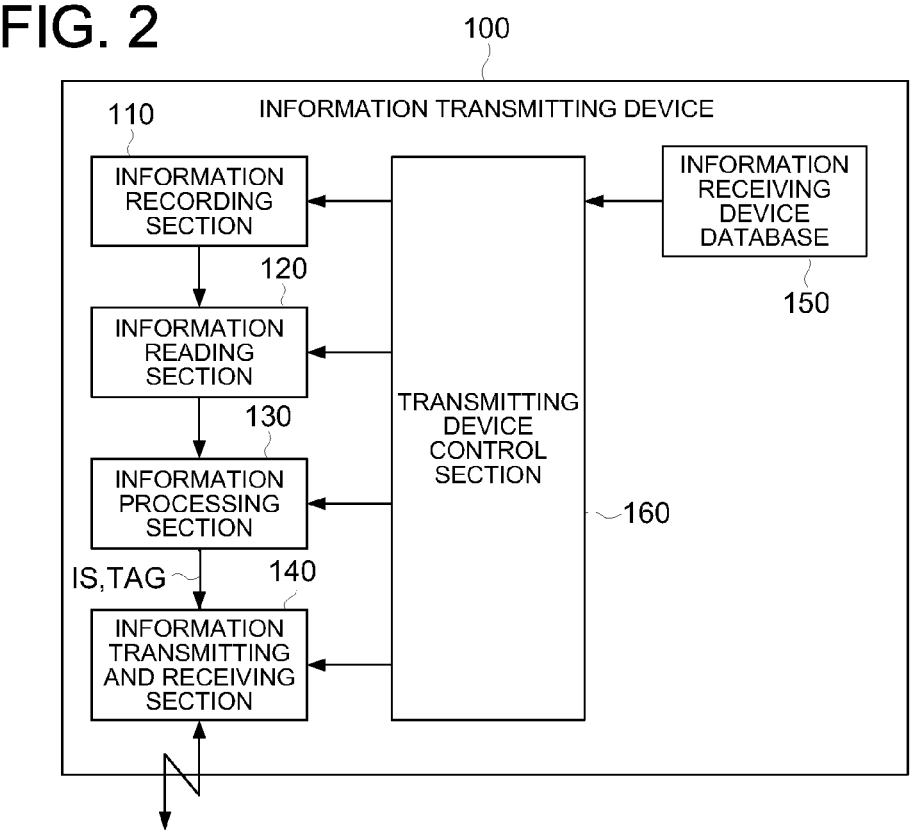
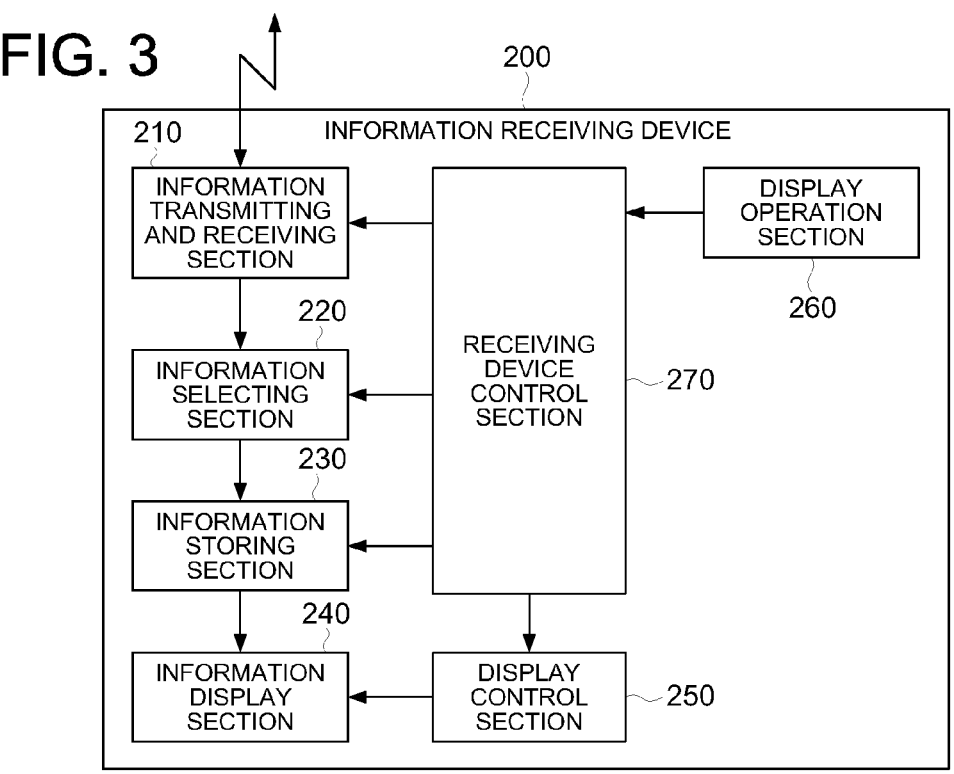

FIG. 6
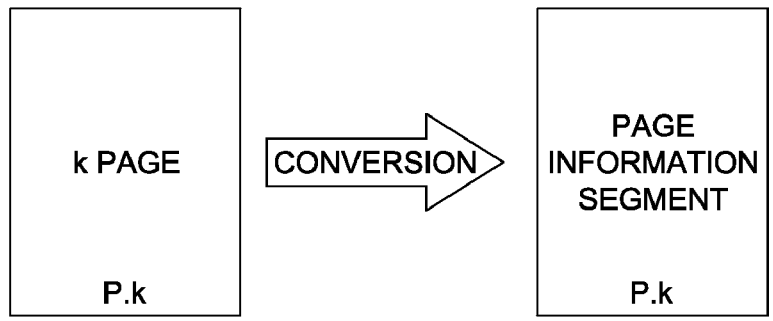
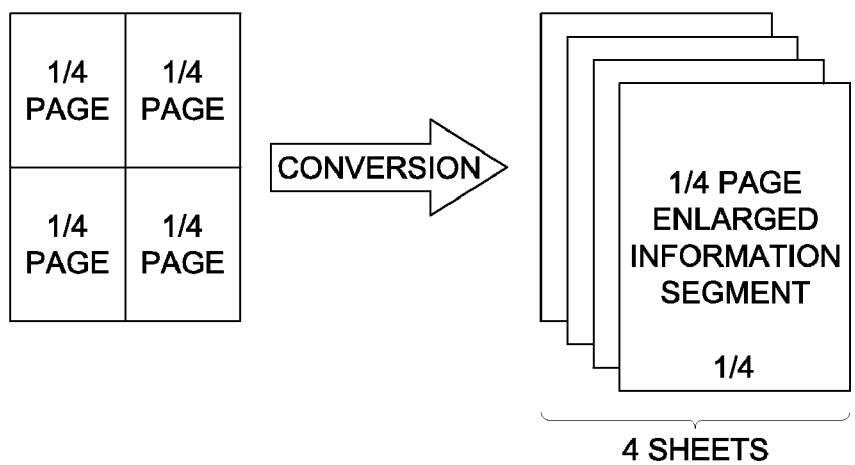
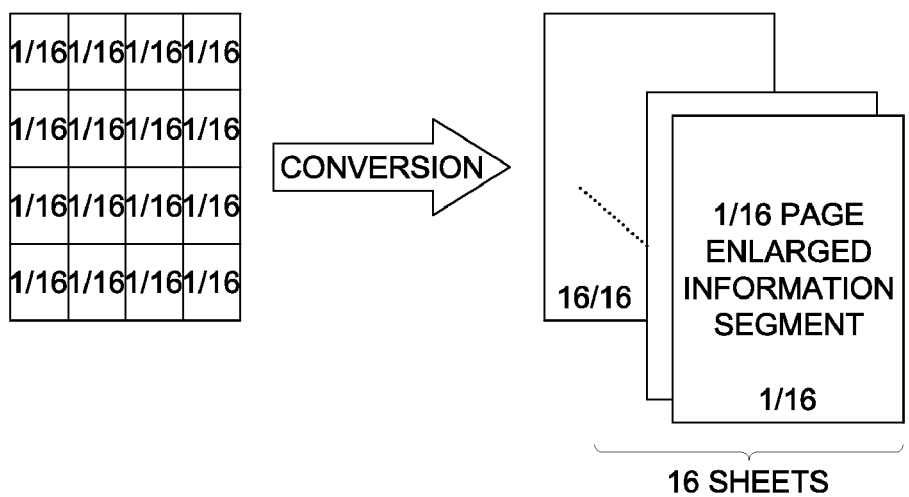

INFORMATION TRANSMITTING AND RECEIVING SYSTEM, INFORMATION TRANSMITTING DEVICE, AND INFORMATION RECEIVING DEVICE

RELATED APPLICATIONS

This application is a National Stage of International Application No. PCT/JP2007/075117, filed with the Japanese Patent Office on Dec. 27, 2007, which claims priority to Japanese Patent Application No. 2007-043582.

TECHNICAL FIELD

The present invention relates to an information transmitting and receiving system including an information transmitting device for transmitting information and information receiving device for receiving and displaying the information transmitted from the information transmitting device, and relates to the information transmitting device and the information receiving device which are utilized in the information transmitting and receiving system.

BACKGROUND TECHNOLOGY

Regarding a method for sharing information in a highly confidential conference or the like, various methods have been proposed.

An electronic conference system, for example, is proposed in which only a user or a terminal that has received authorization and registered in a server can access to a conference information server (for example, refer to Patent Document 1). Further a method for delivering documents to be used in an electronic conference is proposed, where the document to be used in the electronic conference can only be accessed from a terminal installed with a portable key device (for example, refer to Patent Document 2).

Further in an electronic conference system utilizing a wireless system, a method is proposed where only conference terminals received authentication keys transferred previously to the conference can attend the conference in order to prevent the connection from a terminal of other than permitted conference attendants (for example, refer to Patent Document 2). Further, for example, another method is proposed where conference documents can be read only in the conference room by utilizing a wireless LAN and limiting the access to the document only in specific space area (for example, refer to Patent Document 4).

Further, in pay-TV system which allows only contractants to view the contents, a method of specifying a time limit to be able to view the contents is proposed, where by broadcasting the contents in scramble and attaching data of viewable time limit to the scrambled information, reproduction or viewing the contents is made unable outside the viewable period (for example, refer to Patent Document 5).

In contrast, in a highly confidential conference, another method can be considered where documents are only displayed by a projector in a conference room, and the documents are not delivered to attendants.

Patent Document 1: Unexamined Japanese Patent Application Publication No. H08-256145;
Patent Document 2: Unexamined Japanese Patent Application Publication No. 2002-41461;
Patent Document 3: Unexamined Japanese Patent Application Publication No. 2004-96495;
Patent Document 4: Unexamined Japanese Patent Application Publication No. 2005-18487;
Patent Document 5: Unexamined Japanese Patent Application Publication No. 2000-196546.

DISCLOSURE OF THE INVENTION

Problems to be Solved by the Invention

However, according to the method proposed in the Patent Documents 1 or 2, since the user can view the information to be used in the conference even after the conference being finished, these method cannot be utilized for the conference where internal-use-only documents are used. Further, the method proposed in the Patent Document 3 does not also describe to prohibit carrying out the document after the conference. Further, the method proposed in the Patent Document 4 does not also describe how to erase the document when going out the conference room or to prohibit carrying out the document. Further, according to the method described in the Patent Document 5, although the time limit for browsing and viewing the contents can be set, the place where viewing is possible can not be specified.

Further, according to the method where documents are not delivered to attendants and only displayed with a projector in a conference room, since the page to be displayed or the magnification rate is specified by the demonstrator, the attendants cannot view the desired page while listening to the explanation, which impedes understanding of the documents.

The present invention is accomplished in view of the above situations, and an object of the present invention is to provide an information transmitting and receiving system, an information transmitting device, and an information receiving device in which you cannot take out confidential information from a highly confidential conference or the like, and at the place of conference you can freely look at the confidential information you desire to read.

Means for Solving the Problems

An object of the present invention can be accomplished by following configurations.

Item 1: An information transmitting and receiving system comprising an information transmitting device for transmitting information, and information receiving device for receiving and displaying the information transmitted from the information transmitting device, wherein the information transmitting device is provided with:

an information reading section which reads out information recorded in an information recording section;

an information processing section which divides the information read out from the information recording section by the information reading section into a plurality of information segments, and gives an identifier uniquely to each divided information segment; and an information transmitting section which repeatedly transmits a bundle of identifiers including the identifier within a first period of time, wherein the information receiving device is provided with:

an information receiving section which receives the bundle of identifiers transmitted from the information transmitting device;

an information selecting section which selects an information segment desired to read from the plurality of information segments:

an information storing section which receives from the information transmitting device and stores the information segment desired to read having been selected by the information selecting section;

an information display section which displays the information segment desired to read having been stored in the information storing section; and a display control section which controls the information display section, wherein the display control section controls the information display section such that in a case where the information receiving section does not receive the identifier given to the information segment desired to read within a second period of time, the information display section stops displaying the information segment desired to read stored in the information storing section.

Item 2: The information transmitting and receiving system described in item 1, wherein the information transmitting device repeatedly transmits a bundle of information segments together with the bundle of identifiers within the first period of time.

Item 3: The information transmitting and receiving system described in item 1, wherein the information receiving device transmits a request of transmission regarding the information segment desired to read, and the information transmitting device transmits the information segment desired to read in response to the request of transmission from the information receiving device.

Item 4: The information transmitting and receiving system described in any one of items 1-3, wherein the information transmitting device is provided with an information receiving device data base in which information regarding the information receiving device is recorded, the information transmitting device executes authentication of the information receiving device based on the information regarding the information receiving device, and transmits the information segment to the authenticated information receiving device via communication.

Item 5: The information transmitting and receiving system described in any one of items 1-4, wherein the second period of time is equal to or longer than the first period of time.

Item 6: The information transmitting and receiving system described in any one of items 1-5, wherein the information transmitting device transmits, by encrypting, the information segment and the identifier.

Item 7: The information transmitting and receiving system described in any one of items 1-6, wherein the communication between the information transmitting device and the information receiving device is executed via wireless transmission.

Item 8: An information transmitting device for transmitting information to be displayed by an information receiving device, provided with:

an information reading section which reads out information recorded in an information recording section;

an information processing section which divides the information read out from the information recording section by the information reading section into a plurality of information segments, and gives a unique identifier for each divided information segment; and an information transmitting section which repeatedly transmits a bundle of identifiers including the identifier within a first period of time.

Item 9: An information transmitting device for transmitting information to be displayed by an information receiving device, provided with:

an information reading section which reads out information recorded in an information recording section;

an information processing section which divides the information read out from the information recording section by the information reading section into a plurality of information segments, and gives a unique identifier for each divided information segment; and an information transmitting section which in addition to repeatedly transmits a bundle of identifiers including the identifier within a first period of time, transmits the information segment for which a transmission request is received from the information receiving device.

Item 10: An information receiving device for displaying information transmitted from information transmitting device, provided with:

an information receiving section which receives via communication a bundle of a plurality of information segments obtained by dividing the information and identifiers, each of the identifiers being uniquely given to each of the plurality of information segments;

an information selecting section which selects an information segment desired to read from the bundle of the information segments and the identifiers received by the information receiving section based on the identifier:

an information storing section which stores the information segment desired to read having been selected by the information selecting section;

an information display section which displays the information segment desired to read having been stored in the information storing section; and a display control section which controls the information display section, wherein the display control section controls the information display section such that in a case where the information receiving section does not receive the identifier given to the information segment desired to read within a second period of time, the information display section stops displaying the information segment desired to read stored in the information storing section.

Item 11: An information receiving device for displaying information transmitted from information transmitting device, provided with:

an information receiving section which receives via communication an information segment obtained by dividing information, and a bundle of identifiers each being uniquely given to each information segment;

an information selecting section which selects an information segment desired to read from the information segments and the bundle of identifiers received by the information receiving section based on the identifier:

a second information receiving section which transmits a request for transmission of the information segment desired to read having been selected by the information selecting section, and receives the information segment desired to read;

an information storing section which stores the information segment desired to read having been received by the second information receiving section;

an information display section which displays the information segment desired to read having been stored in the information storing section; and a display control section which controls the information display section, wherein the display control section controls the information display section such that in a case where the information receiving section does not receive the identifier given to the information segment desired to read within a second period of time, the information display section stops displaying the information segment desired to read stored in the information storing section.

Effect of the Invention

According to the present invention, by providing an information transmitting and receiving system including an information transmission device which repeatedly transmits identifiers attached to the information within a first period of time, and an information receiving device which displays the received information and, in a case where an identifier attached to the information is not received within a second period of time, stops displaying the received information, it is enabled to view the information desired to read freely at a limited place in a limited period of time so that the information transmitting and receiving system, the information transmitting device and the information receiving device can be provided with which confidential information is prevented from being carried out and the information desired to read can be freely viewed at the place.

BRIEF DESCRIPTION OF THE DRAWINGS

FIG. 1 is a block diagram showing an example of the configuration of the information transmitting and receiving system relating to the present invention.

FIG. 2 is a block diagram showing an example of the internal configuration of the information transmitting device relating to the first embodiment.

FIG. 3 is a block diagram showing an example of the internal configuration of the information receiving device.

FIG. 6 is a schematic view (⅔) showing an example of a method for giving an identifier by dividing the information file into information segments.

EXPLANATION OF THE SYMBOLS

Figure 4:
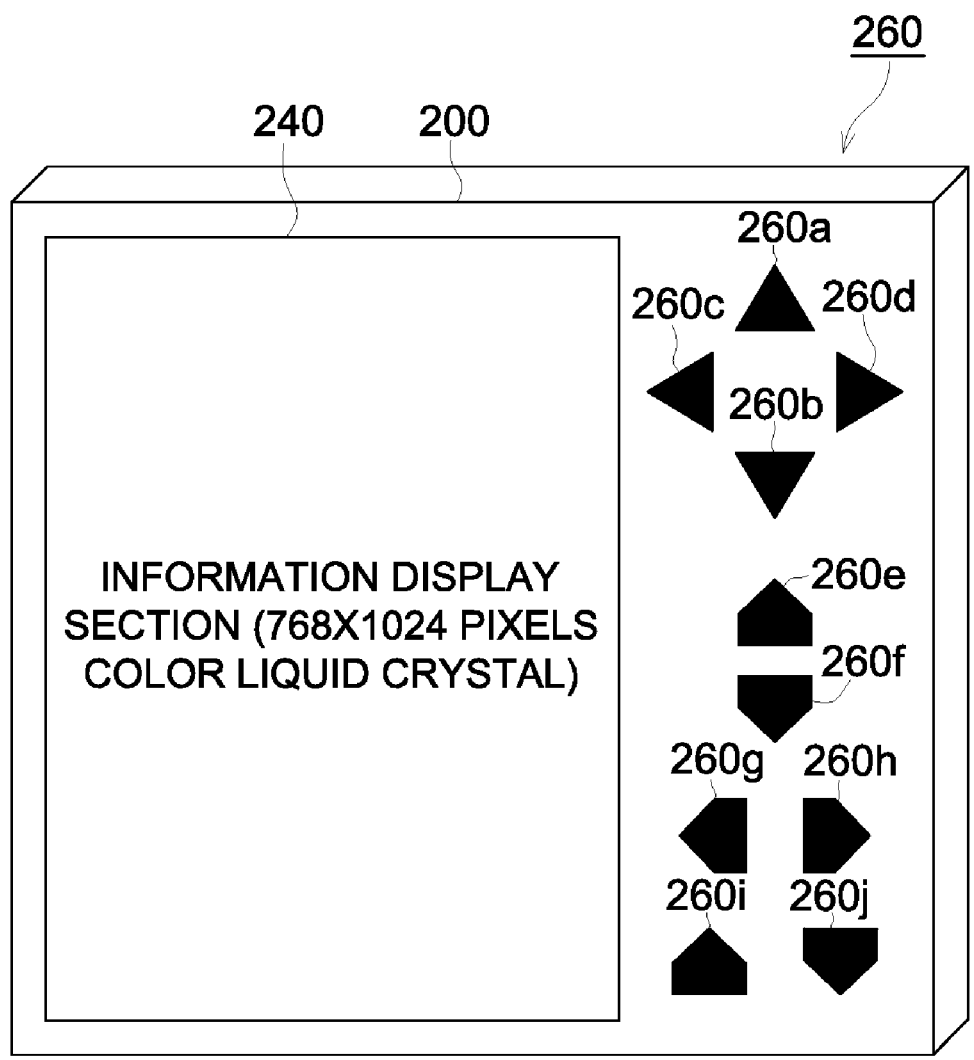
FIG. 4 is a schematic view showing an example of the outer appearance of the information receiving device.

1: Information transmitting and receiving system
2: Conference room
3: Dummy information transmitting device
10: Receivable range
100: Information transmitting device
110: Information recording section
120: Information reading section
130: Information processing section
140: Information transmitting and receiving section
150: Information receiving device data base
160: Transmitting device control section
200: Information receiving device
210: Information transmitting and receiving section
220: Information selecting section
230: Information storing section
240: Information display section
250: Display control section
260: Display operation section
270: Receiving device control section
IS: Information segment
IST: Information segment desired to read
TAG: Identifier

DESCRIPTION OF THE PREFERRED EMBODIMENTS

Hereinafter, the present invention will be described based on the embodiment shown by the drawings. However, the present invention is not restricted by the embodiments shown by the drawings. In the drawings, the same or the equivalent parts are given the one and same symbol in order to omit duplicative descriptions.

Firstly, a general configuration of the information transmitting and receiving system common to the first and the second embodiments of the present invention will be described by using FIG. 1. FIG. 1 is a block diagram showing an example of the general configuration of the information transmitting and receiving system.

In FIG. 1, information transmitting and receiving system 1 is the system in which conference information and the like is transmitted from information transmitting device 100 to information receiving device 200, and the received information is read at information receiving device 200. The system is configured with one information transmitting device 100 and a plurality of information receiving devices. Information transmitting device executes short distance transmission receivable only within a small area such as in conference room 2, for example by executing a wireless transmission by UWB (Ultra Wide Band transmission).

In the example shown in FIG. 1, since information receiving devices A, B, C and D are provided in receivable range 10 of transmission from information transmitting device 100, they can receive the transmission from information transmitting device 100, meanwhile information receiving device E cannot receive the transmission from information transmitting device 100 since it is provide outside the receivable range 10.

In order not to be receivable of the transmission from information transmitting device 100 outside the conference room 2, dummy information transmitting device 3 is preferably provided which transmits, toward outside of conference room 2, dummy information of the same frequency band as that of information transmitting device 100. Further, information receiving device 200 is preferably configured such that when the dummy information is received, contents stored in information storing section 230 (to be described later) are erased, and display contents of information display section 240 (to be described later) are erased as well.

(First Embodiment)

Next, the first embodiment of the present invention will be described by using FIGS. 2-11.

An example of the configuration of information transmitting device 100 relating to the first embodiment of the present invention will be described by using FIG. 2. FIG. 2 is a block diagram showing an example of the internal configuration of the information transmitting device relating to the first embodiment.

In FIG. 2, information transmitting device 100 is configured with information recording section 110, information reading section 120, information processing section 130, information transmitting and receiving section 140, information receiving device data base 150, transmitting device control section, and the like.

Information recording section 110 stores documents or images for such as presentation information for a conference in file format, and is configured with a hard disc of a personal computer (hereinafter referred as PC) and the like.

Information reading section 120 selects and reads, from the files stored in information storing section 110, an information file to be sent toward information receiving device 200, and sends to information processing section 130.

Information processing section 130 divides the information file sent from information reading section 120 into basic units for transmitting (hereinafter the basic unit is referred as information segment IS), and gives an identifier TAG unique to each divided information segment IS, and transmits to information transmitting and receiving section 140 by encrypting the information segment IS. Regarding the method of dividing the information file into the information segment IS and giving the identifier TAG will be described in detail by using FIGS. 5-7, and regarding the identifier TAG and encrypting will be describe in detail respectively by using FIG. 8 and FIGS. 9 and 10.

Information transmitting and receiving section 140 is for example a wireless communication device connected to a PC, which transmits the encrypted information segment IS and the identifier TAG etc. sent from information processing section 130 toward information receiving device 200, and in addition, receives signals, sent from information receiving device 200, such as a request for sending the information segment IS desired to read. Detailed explanation regarding the transmitting and receiving of the signals will be given by using FIG. 10 and FIG. 13.

Communication method of information transmitting and receiving section 140 will be described by using the USB which is preferably used for a high-speed large-capacity communication in a small area; however the USB is not essential and a wireless LAN or a wireless communication such as Bluetooth may be used. Further, light communication of IrDA or communication by wired LAN may be used.

Information receiving device database 150 is configured with a hard disc of PC and the like and stores the information regarding information receiving device. Based on the information stored in the data base, transmitting and receiving of the encrypted information segment IS are executed. Configuration of information receiving device data base will be described in detail by using FIG. 9.

Transmitting device control section 160 is a controller to control the behavior of each of the above described configuration elements of information transmitting device 100.

Information transmitting device 100 may be configured with, for example, CPU on a PC, hard disc, and memory and the like. In this case, each of the above described functions of information transmitting device 100 is realized for example by a program stored in a recording medium such as the hard disc on the PC.

Next, information receiving device 200 relating to the first embodiment of the present invention will be described by using FIG. 3 and FIG. 4. FIG. 3 is a block diagram showing an example of the internal configuration of the information receiving device 200.

In FIG. 3, information receiving device 200 is configured with information transmitting and receiving section 210, information selecting section 220, information storing section 230, information display section 240, display control section 250, display operation section 260, receiving device control section 270, and the like. These sections may, as the hardware, be configured with the combination of a display device, a CPU to control the display, and a memory; and each function can be realized by the program stored in the memory.

Information transmitting and receiving section 210 is a wireless communication device of USB and the like which being compatible to information transmitting and receiving section 140. Information transmitting and receiving section 210 receives the information segment IS and the identifier TAG etc. sent from information transmitting device 100, and in addition, transmits, toward information transmitting and receiving device 100, various signals necessary for the transmission and reception between information transmitting and receiving device 100 such as a request for sending the information segment IS desired to read. Detailed explanation regarding the transmitting and receiving of the signals will be given by using FIG. 10 and FIG. 13.

Information selecting section 220 selects the information segment IS desired to read from the information segments IS received by information transmitting and receiving section 210 by using the identifier TAG given to the information segment IS, and sends only the information segment desired to read IST toward information storing section 230.

Information storing section 240 is configured with, for example, storage element such as a memory, and temporarily stores the information segment IS sent from information selecting section 220.

Information display section 240 is configured with, for example, a liquid crystal display element and the like, and display the information segment IS stored in information storing section 230.

Display control section 250 is a controller which controls to display on information display section 240, and allows or prohibits for information display section 240 to display the information segment IS stored in information storing section 230.

Display operation section 260 is configured with a plurality of buttons and the like, where a user can select the information segment desired to read, and display on information display section 240. The configuration of display operation section 260 will be described in detail using FIG. 4.

Receiving device control section 270 is a controller which controls movements of each configuration element in the above described information receiving device 200.

In the present embodiment, a liquid display element is exemplified, though as an alternative, a device in which display device itself has a memory function (for example, a Chiral Nematic Liquid Crystal Device and the like) may be utilized. In this case the display element itself is assumed to have both functions of information display section 240 and information storing section 230.

FIG. 4 is a schematic view showing an example of the outer appearance of the information receiving device 200.

In FIG. 4, information display section 240 and information operation section 260 are arranged on the surface of information receiving device 200. Information display section 240 is configured with, for example, a color liquid crystal panel of lateral 768 pixels by vertical 1024 pixels, to display the information received by information receiving device 200.

Display operation section 260 is configured with up/down and left/right scroll buttons 260a, b, c, and d; enlarge/reduction specifying buttons 260e and 260f; previous page specifying button 260*g*, next page specifying button 260*h*, previous document specifying button 260*i*, and next document specifying button 260*j* and the like. A user selects the information to be displayed on information display section 240 by operating each button on display operation section 260. As alternatives to the buttons, configurations using a wheel, joystick or 10 keys may be used.

Information receiving device 200 may be a fixed terminal installed in the conference room or a portable type terminal. In the case of portable terminal, information receiving device 200 is preferably driven by a primary battery or a secondary battery. In the case of secondary battery, it is charged when being placed on a cradle. Or, when it is paced on a conference table, it may be charged by an induction power antenna placed on the conference table.

Figure 5:
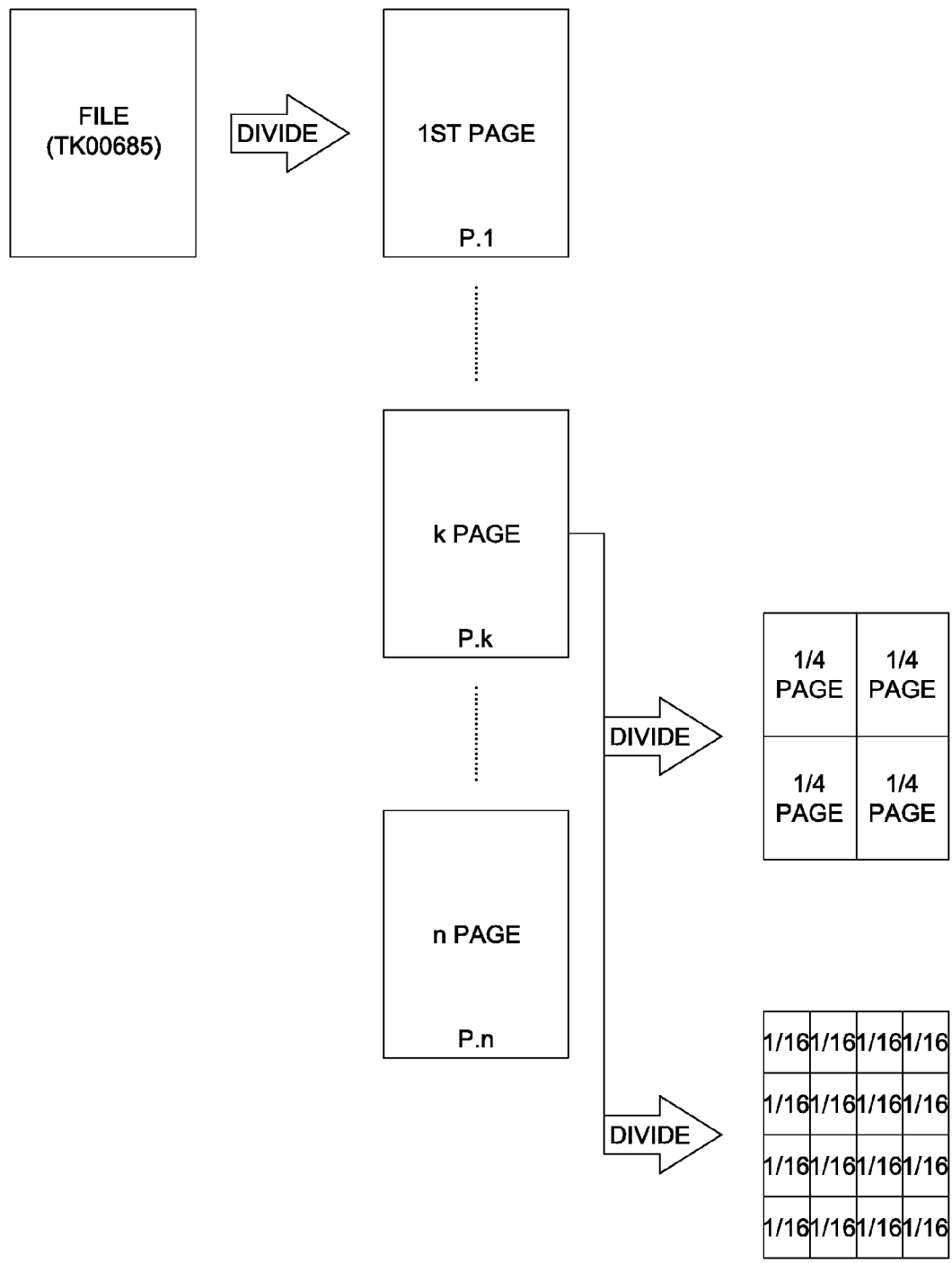
FIG. 5 is a schematic view (⅓) showing an example of a method for giving an identifier by dividing the information file into information segments.
Figure 7:
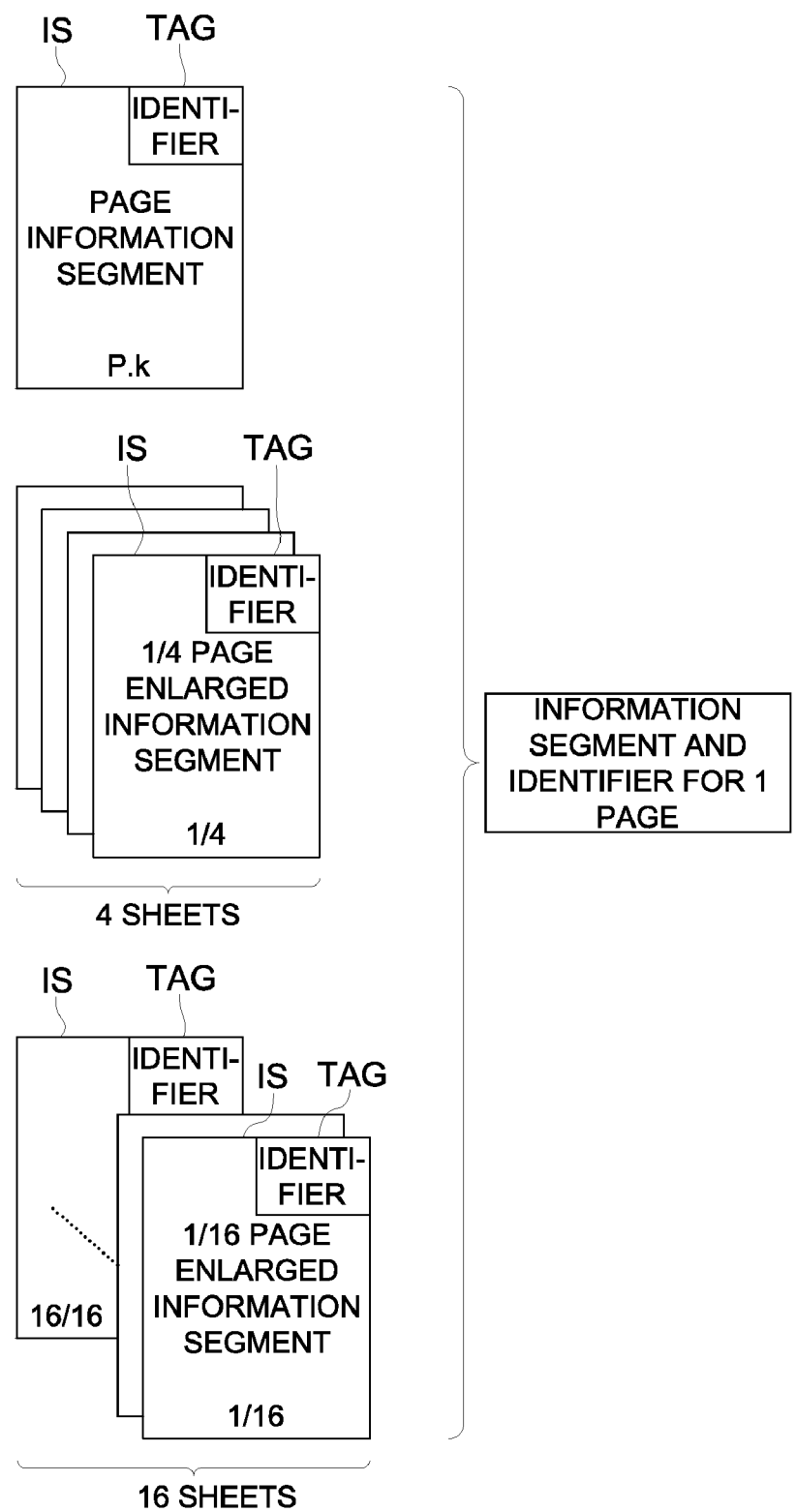
FIG. 7 is a schematic view (3/3) showing an example of a method for giving an identifier by dividing the information file into information segments.

Next, the method of dividing the information file into information segments IS and giving the identifier TAG in information processing section 130 will be described using FIGS. 5-7. FIGS. 5-7 are schematic views showing an example of a method for giving identifiers TAG by dividing the information file into information segments IS.

In FIG. 5, an information file (for example, a document file named as TK00685) is configured with n pages. Information processing section 130, firstly divides the information file into each page from $1^{st}$ page to nth page. In order to view after enlargement, each page (k-page is exemplified in FIG. 5) is divided into fourth parts and sixteenth parts. The number of divided parts can be changed in need. At this time, for easy viewing of division border lines, it is preferable to divide the file so that overlapping margins are formed to some extent.

In FIG. 6, document data for one page (k-page is exemplified in FIG. 6) is converted to image data conforming to the number of pixels (for example, horizontal 768 pixels by vertical 1024 pixels of color) held in information display section 240 of information receiving device 200. The converted image data is the above described basic unit data for transmitting, namely information segment IS. Thus, in the present example, the number of pixels of each information segment IS are 768×1024 pixels which being the same as the size of the screen of information display section 240 of information receiving section 240.

Quarterly divided document data of the same page is converted into four times enlarged image data, namely the information segment IS, conforming to the number of pixels (for example, horizontal 768 pixels by vertical 1024 pixels of color) held in information display section 240 of information receiving device 200. Similarly, sixteenth divided document data of the same page is converted into sixteen times enlarged information segment IS conforming to the number of pixels (for example, horizontal 768 pixels by vertical 1024 pixels of color) held in information display section 240 of information receiving device 200. Meanwhile, in this case, the expression of "enlarge" is used, in comparison to the display size of the case where document data of one full page is displayed. This "enlarge" means to create the image data for displaying a prescribed area (one full page, one fourth page, or one sixteenth page) with a prescribed number of pixels (horizontal 768 pixels by vertical 1024 pixels), and does not necessarily mean an electronically enlarging process. Namely, if the document data have sufficient numbers of pixels, a thinning process, so called a reduction process, is possibly be executed.

As shown in FIG. 7, on each of 21 sheets of information segments IS, which are obtained by the conversion in FIG. 6, including one page information segment IS, fourth divided and four times enlarged information segments IS, and sixteenth divided and sixteen times enlarged information segments IS, an identifier TAG is given to complete transmitting information for one page document. In the example shown in FIG. 5, since the similar operation is conducted for every page of n pages document file, a bundle of total (n×21) sheets of information segments IS and identifier TAG is formed.

Figure 8A:
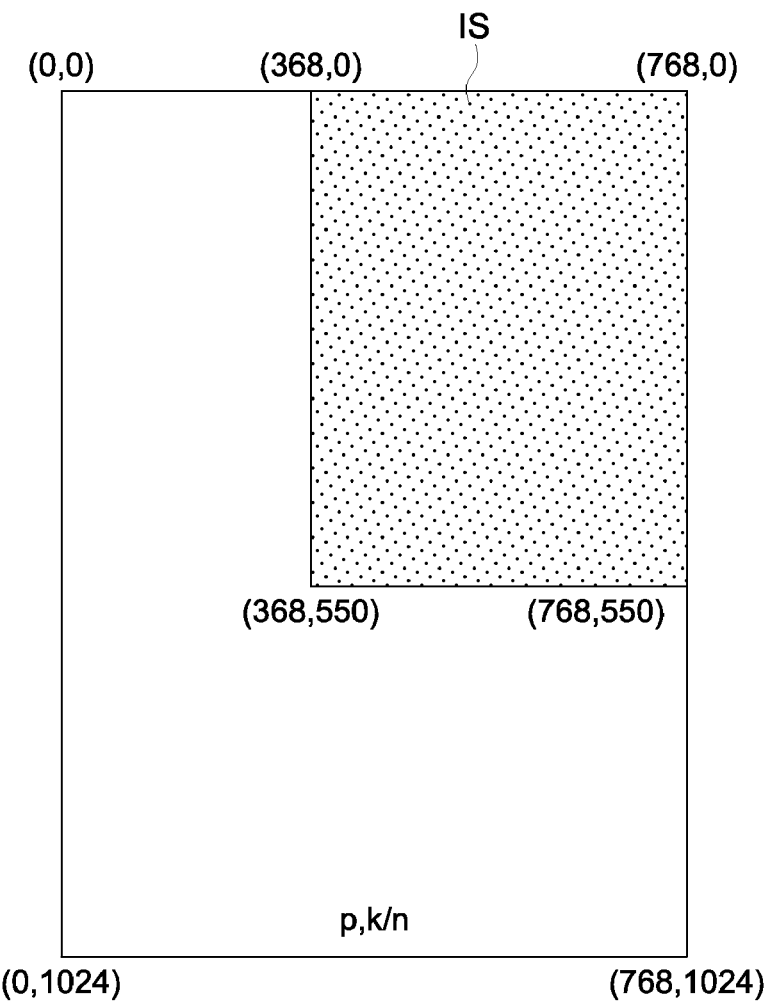
FIGS. 8a and 8b are schematic diagrams showing an example of an information segment and an identifier given to it.
Figure 8B:
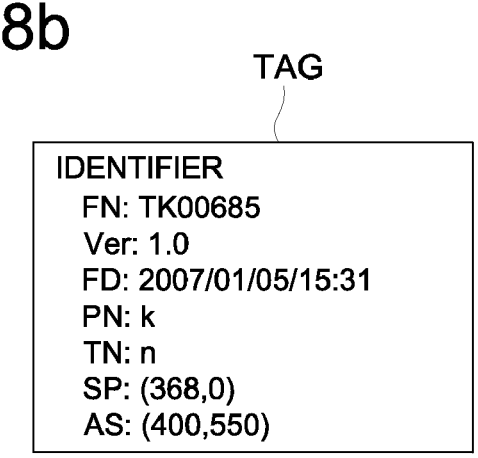

Next, the identifier TAG given to the above described information IS will be described using FIG. 8. FIG. 8 is a schematic diagram showing an example of an information segment IS and an identifier TAG given to it. FIG. 8*a* shows an example of a position where information segment IS is arranged in an original page. FIG. 8*b* shows an example of the identifier TAG given to the information segment IS.

In FIG. 8*a*, the information segment IS is formed such that k page out of n pages of document data is divided fourth with overlapping margins (for example, in the area of coordinates (368, 0) to (768, 550)) and enlarged four times to be image data.

As shown in FIG. 8*b*, the identifier TAG given to this information segment IS is configured with the following information.

(1) File name FN (for example, TK00685) of the original information file;
(2) Version Ver (for example, 1.0) of the original information file;
(3) Latest updated time and date FD(for example, 2007/01/05/15:31);
(4) Original page number PN (for example, k) included in the information segment IS;
(5) Total number of pages TN (for example, n) of the original information file;
(6) Position on the original page SP (for example, shown by the coordinate of upper left corner, (368, o)) in the information segment IS;
(7) Size of the information segment IS: AS (for example, (400, 550)) on the original page, by these information, the information segment IS is uniquely identified.

Figures 9, 10:
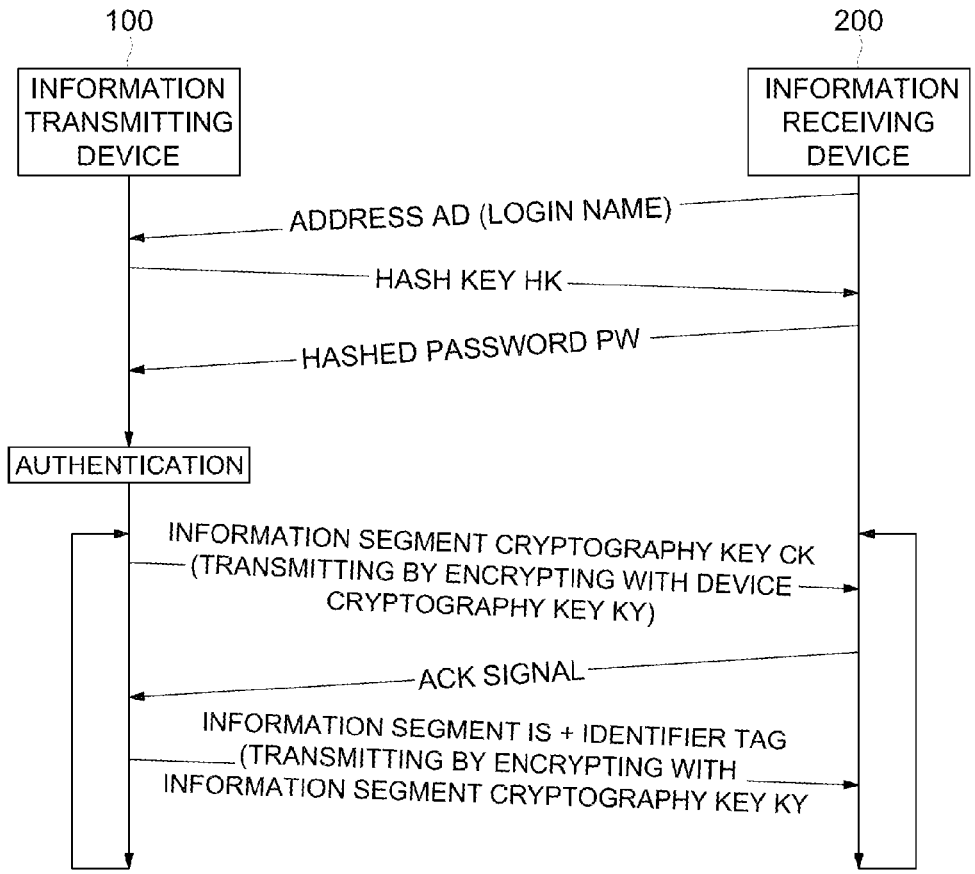
FIG. 9 is a schematic diagram showing a configuration of the information receiving device data base provided on the information transmitting device.
FIG. 10 is a schematic diagram showing a transmitting/receiving protocol of encrypted information segment and identifier between the information transmitting device and the information receiving device.

Next, an example of the method of transmitting by encrypting the information segment IS and the identifier TAG will be explained by using FIG. 9 and FIG. 10. FIG. 9 is a schematic diagram showing a configuration of the information receiving device data base 150 provided on the information transmitting device 100.

In FIG. 9, information receiving device data base 150 is for example configured with the following information:

(1) Name of information receiving device RN (for example, Device A);
(2) Address of information receiving device AD (for example, 00-20-6B-10-45-67);
(3) Password of information receiving device PW (for example, Xy0dgudD);
(4) Device cryptography key of information receiving device KY (for example, 012345);

By these information, information transmitting device 100 can identify each information receiving device 200.

FIG. 10 is a schematic diagram showing a transmitting/receiving protocol of encrypted information segment IS and identifier TAG between the information transmitting device 100 and the information receiving device 200.

IN FIG. 10, information receiving device 200 requiring to receive a transmission from information transmission device 100 transmits login request with its address AD as a login name toward information transmission device 100. Information transmitting device 100, which has received the address AD of information receiving device 200, refers information (2) in information receiving device data base 150 shown in FIG. 9, and identifies the information receiving device 200 which has sent login request, and if it is the information receiving device having a login right, sends back hash key HK. Hash key HK is created by generating random numbers for every login request case.

Information receiving device 200 makes its password hashed by using the hash key HK received, and transmits the hashed password PW toward information transmitting device 100. Information transmitting device 100 makes the password memorized in information receiving device data base 150 for previously identified information receiving device 200 hashed by using the same hash key HK, and compares with the hashed password sent from information receiving device 200. When the two hashed passwords are identical, the authentication of information receiving device 200 requiring login is completed to be a login state.

In a case where, similarly to information transmitting device 100, information receiving device 200 is provided with information transmitting device data base to identify information transmitting device 100, by concurrently sending the hashed address or password, of the information transmitting device 100, which have been hashed by the same hash key when information transmitting device 100 sends back the hashed key HK toward information receiving device 200, it can be confirmed whether or not the information transmitting device 100 to which the information receiving device 200 has sent the login request is the objective information transmitting device 100. This is capable of further improving security protection.

Next, information transmitting device 100 sends to authenticated information receiving device 200 cryptography key for information segment CK after encrypting with device cryptography key KY which is memorized in information receiving device data base 150 as a dedicated key to the authenticated information receiving device 200. Although, the cryptography key for information segment CK is common to all authenticated information receiving devices 200, since it is transmitted after individually encrypted with every information receiving device 200 as described above, it is prevented from leaking to unauthenticated information receiving device.

Cryptography key CK for information segment IS is renewed after every information segments IS having been once transmitted, and is transmitted again from information transmitting device 100 to authenticated information receiving device 200 after individually encrypted similarly to the above described. Upon receiving the encrypted information segment cryptography key CK, information receiving device 200 sends an Ack signal for receipt acknowledgement toward information transmitting device 100.

In a case where an Ack signal from a certain information receiving device 200 cannot be received, or the signal level of the Ack signal is lower than a prescribed value, information transmitting device 100 invalidates the authentication of the information receiving device 200. The information receiving device, whose authentication is made invalid, cannot login without another above described login request and receiving authentication, and further cannot decrypt information segment IS since it cannot receive the information segment cryptography key CK from information transmitting device 100.

Further in a case where the signal level from information transmitting device 100 is lower than a prescribed value, information receiving device 200 does not send back the Ack signal when receiving the encrypted information segment cryptography key CK. Thus, similarly to the above described, the authentication of the information receiving device 200 by the information transmitting device 100 is made invalid, and another login is necessary.

Information transmitting device 100, after individually transmitting information segment cryptography key CK to all authenticated information receiving devices 200 and receiving Ack signals from each information receiving device 200, concurrently transmits information segment IS and identifier TAG which are encrypted with information segment cryptography key CK toward all the authenticated information receiving device 200. Since, the information segment IS and identifier TAG which are encrypted with information segment cryptography key CK, transmitted this time, are common for all the authenticated information receiving devices 200, each information receiving device 200 does not send back the Ack signal.

If there is an information file which became unnecessary to be read by information receiving device 200, by deleting this file from information recording section 110 of information transmitting device 100, or by prohibiting to be read out by information reading section 120 from information recording section 110, the information file is prevented from being transmitted through information transmitting and receiving section 140. Since then, said information file become impossible be read on information receiving device 200.

Information transmitting device 100 transmits all information segments IS and identifiers TAG for all conference information and the like which are necessary to be transmitted, within a predetermined first period of time. After completing transmission of all the information segments IS and identifiers TAG, the operations (after the authentication) described in FIG. 10 are repeated before the predetermined first period elapses since the time of starting transmission of the previous information segments IS and identifiers TAG. If there is a case where all the necessary information segments IS and identifiers TAG cannot be transmitted within the predetermined first period of time, the first period of time is previously changed. The first period of time is for example about five minutes. The first period of time may be changed as needed, for example, according to communication between information transmitting device 100 and information receiving device 200.

In the present example, in the case where information transmitting device 100 transmits information segment cryptography key CK toward information receiving device 200, respective signal intensities are monitored and in case that the intensities are smaller than the prescribed value, the authentication is made invalid. In addition to this, the authentication may be made invalid when a change of monitored signal intensities is larger than a prescribed value. By this procedure, information transmission will be stopped when a distance between information transmission device 100 and information receiving device is largely changed, thus further security improvement can be realized.

In the present example, in order to improve the efficiency at the time of transmitting information segment IS, information transmitting device 100 sends, to all the information receiving device 200, the same key as information segment cryptography key, however, since the protocol for sending the key from information transmitting device 100 to information receiving device 200 is set one-to-one, information segment cryptography key different from each information receiving device 200 may be transmitted.

In this case, since decodable information segment IS can be made different for each information receiving device 200, a processing is enabled where a specific information file is readable on only a specific information receiving device 100, or a specific information file is prohibited to be read on a specific information receiving device 200. Further, not only prohibiting the reading of a total information file on a specific information receiving device 200, prohibiting the reading of a specific page of the file or a specific portion of a page may be possible, thus further improvement of security can be realized.

Further, although in the present example, as information segment IS image data are used, instead, text data may be used to form information segment IS. In this case, instead of dividing the information segment into forth or sixteenth as described in FIGS. 5-7, division is executed by a unit of a plurality of lines of the information file. And on the identifier tag of the information segment IS, described is information regarding from what line to what line on what page of the file. In this case, in order for displaying the text data on information receiving device 200, a font data needs to be installed, or at the time of transmitting information segment IS and identifier TAG, the font data needs to be transmitted in a proper cycle to the information receiving device 200.

Furthermore, In the case where information transmitting device 100 authenticates information receiving device 200, not only using the password of information receiving device 200, but by using also an ID and a password of a user who uses the information receiving device 200, the security can be improved further. The user ID and the password are memorized in an external memory such as a USB memory of a memory card, and are encrypted and transmitted to information transmitting device 100, by connecting the external memory to information receiving device 200.

For realizing this, information transmitting device 100 are provided with a user data base in addition to information receiving device data base 150. As for a user authentication protocol, a protocol utilizing a hash key HK can be used similarly to the above described authentication of information receiving device 200.

Figure 11:
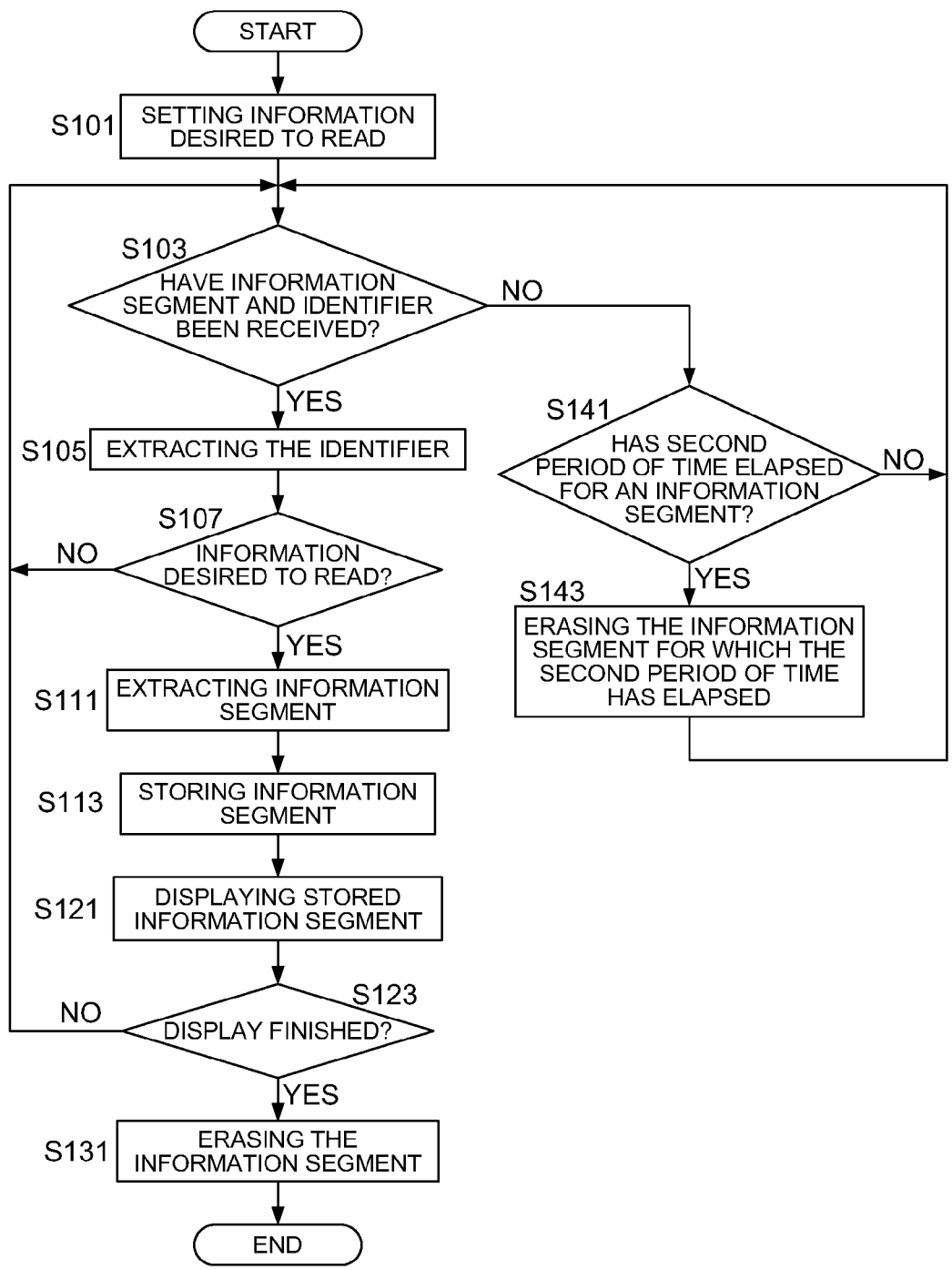
FIG. 11 is a flow chart showing an example of reading method of the received information segment by the use of the information receiving device.

Next, a method of viewing the received information segment IS on information receiving device 200 will be described by using FIG. 11. FIG. 11 is a flow chart showing an example of viewing/reading method of the received information segment by the use of the information receiving device 200.

In FIG. 11, at step S101, display operation section 260 is operated by a user, and a part (page or a portion in a page) desired to read in conference information and the like is selected and set up. Since the setting at step S101 is executed at arbitrary timing by the user, it may be configured such that when display operation section 260 is operated the process can immediately return to step S101, for example by setting as an interruption mode and the like. Meanwhile, in a state that information receiving device 200 is initially authenticated, a voluntary part of the information (for example a cover sheet or contents of page) of conference information may be automatically selected.

In step S103, confirmed is whether any information segment IS and its identifier TAG is received among a bundle of all information segments IS and identifiers TAG of the conference information, which are needed to be sent, encrypted and sequentially transmitted from information transmitting device 100. If received (step S103; Yes), the secret code of the received signal is decoded, identifier TAG is extracted and the process proceeds to step S107.

If not received, (step S103; No), confirmed in step S 141 is whether there is an information segment IS for which a predetermined second period of time has elapsed in information storing section 230. The second period of time is determined to be same as or longer than the predetermined first period of time explained in FIG. 10. In a case where there is no information segment IS for which the predetermined second period of time has elapsed (step S141; No), the process returns to step S103, and repeats step S103 and step S104 and waits until any information segment IS and its identifier TAG is received.

In a case where there is an information segment IS for which a predetermined second period of time has elapsed (step S141; Yes), namely, in a case where the identifier TAG of said information segment IS is not received within the second period of time, in step S143, contents of said information segment IS stored in information storing section 230 is erased, and the process return to step S103. The second period of time is for example about ten minus. Meanwhile, the second period of time may be also made changeable in needs according to the communication between information transmitting device 100 and information receiving device 200. Thus, the display of information segment IS is stopped.

In step S107, based on the identifier TAG extracted at step S105, confirmed is whether information segment IS received at step S103 is the information segment IS including the part desired to read which having been selected by the user at step S101. If not the information segment including the part desired to read (step S107; No), the process returns to step S103 and after receiving next information segment IS and its identifier TAG, the above described operations are repeated.

If confirmed is the information segment including the part desired to read (step S107; Yes), at step S111 the information segment IS is extracted. In step S113, the information segment IS extracted at step S111 and the identifier TAG extracted at step S105 are stored in information storing section 230. However, in a case where identifier TAG already stored in information storing section 230 is identical to the identifier TAG presently extracted in step S105, since the information segment IS including the information desired to read having been already stored in information storing section 230, operations of step S111 and step S113 need not be executed.

Here, in a case where the part desired to read resides on a plurality of information segments IS, when storing the information segment IS extracted in step S111 into information storing section 230 in step S113, by storing the extracted information segment IS with shifting in parallel in a coordinate system of the memory space, the part desired to read in the information segment can be selected. Thus, by repeating the operations from step S103 to step S113, the part desired to read residing on a plurality of information segments IS can be voluntarily extracted.

Next, in step S121, the part desired to read stored in step S121 into information storing section 230 is displayed on information display section 240. In step S123, confirmed is whether to finish the display. In case of finishing (step S123; Yes), in step S131 the information segment IS stored in information storing section 230 is erased and the process is completed.

In case of not finishing the display (step S123; No), the process returns to step S103, and waits next transmission of a bundle of information segment IS and identifier TAG, and upon receiving the bundle of the information segment IS and identifier TAG, repeats the above described operations to repeatedly display the information desired to read.

Further, by setting a priority order of each information segment IS according to it degree of security level, and information segment IS of the higher security level is set to be erased the earlier, improvement of the security can be further attained. For example, in the case shown in FIGS. 5-7, where the information file is divided into information segment IS and giving identifier TAG, the priority order is previously set for each information file before division and conversion.

Alternatively, the information segment IS of the higher enlargement ratio may be given the higher priority order.

And, by describing this priority order on the identifier TAG given to the information segment, the priority order is inherit to the information segment IS, the above described first period of time and the second period of time can be shortened according to the priority order. By this procedure, in a case where information receiving device 200 became unable to receive transmission signals from information transmitting device 100, for example when information receiving device 200 moves out of the conference room, and the authentication of the information receiving device becomes invalid, the information segment IS having the higher priority order is erased in the shorter time period from information storing section 230, thus, further security improvement can be achieved.

In the present example, explained is that in the case where information receiving device 200 moves out of the conference room becoming unable to receive transmission signals from information transmitting device 100, and the authentication becomes invalid, the information segment IS stored in information storing section 230 is erased, however, it is also possible for a specific user, the information segment IS is not erased but maintained with encryption for later confirmation.

In this case, firstly, when authenticating information receiving device 200, information transmitting device 100 authenticates the user of information receiving device 200 as well. The user authentication is executed by using a user ID and/or password recorded in an external memory such as a USB memory or memory card. Specifically, the user authentication is executed by inserting the external memory in which the user ID and/or the password are recorded into the information receiving device 200.

The information segment IS for which the identifier TAG is not received within the above mentioned second period of time, is not deleted from information storing section 230, but for example encrypted by using information segment cryptography key CK and stored in information storing section 230.

Even after the authentication with information transmitting device 100 became invalid, during when the above described external memory recording the user ID and/or password is installed, the information receiving device 200 can decode the encrypted information segment IS stored in information storing section 230, thus can keep displaying the information segment IS.

If the external memory recording the user ID and/or password is removed from information receiving device 200, information receiving device 200 deletes the encrypted information segment IS from information storing section 230. After that, said information segment IS cannot be displayed.

In this way, by enabling the display of information segment IS during when the authenticated user uses information receiving device 200, the user can confirm the information after finishing the conference; and by immediately deleting the information segment IS after the authenticated user finishes the use of information receiving device 200, a risk of information outflow can be eliminated.

As described above, according to the first embodiment of the present invention, by providing an information transmitting and receiving system configured with: an information transmitting device which divides the information into information segment IS, gives a unique identifier TAG to each of the information segment IS, and repeatedly transmits the bundle of information segment IS and the identifier TAG within a first period of time; and an information receiving device which extracts and displays the information segment IS desired to read from the bundle of received information segment IS and identifier TAG, and if the identifier TAG given to the information segment IS cannot be received within a second period of time, stops displaying of the information segment IS, it becomes possible to provide an information transmitting and receiving system, an information transmitting device, and an information receiving device where confidential information outflow is prevented and the information desired to read can be freely viewed at the place in a highly confidential conference etc., since the information desired to read can be freely viewed in a limited place and in a limited time period.

(Second Embodiment)

The second embodiment of the present invention will be described by using FIGS. 12 to 14. Although, in the first embodiment, information transmitting device 100 concurrently transmits the information segment IS and identifier TAG toward all information receiving devices 200, in the second embodiment, the information transmitting device 100 transmits only identifiers TAG to all the information receiving devices 200, and after receiving a request of transmitting information segment IST desired to read from each information receiving device 200, sends information segment IS separately to each information receiving device 100.

Firstly, an example of configuration for information transmitting device 100 in the second embodiment will be described using FIG. 12. FIG. 12 is a block diagram showing an example of an internal configuration of the information transmitting device 100 relating to the second embodiment.

Figure 12:
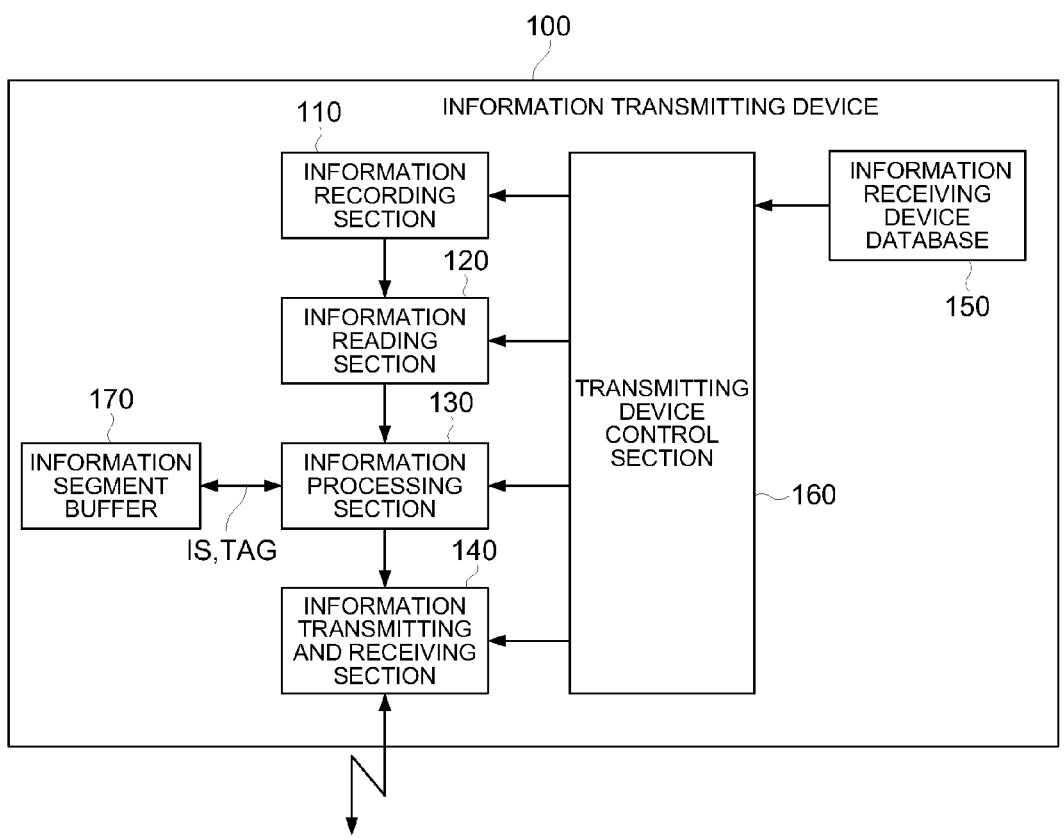
FIG. 12 is a block diagram showing an example of an internal configuration of the information transmitting device relating to the second embodiment.

In FIG. 12, in addition to the configuration of information transmitting device 100 described in the first embodiment, information transmitting device 100 is provided with information segment IS buffer 170 which temporarily stores the information segment IS and identifier TAG created by information processing section 130. Hereinafter, only different portions from the first embodiment shown in FIG. 2 will be described.

Information processing section 130 divides the information file sent from information reading section 120 into basic units (hereinafter referred as information segment IS), for transmission, gives an identifier TAG for each divided information segment IS, and sends toward information segment IS buffer 170. Then, reading out the information segment IS and identifier TAG temporarily stored in information segment IS buffer 170, and after encrypting, sends to information transmitting and receiving section 140. Further, information processing section 130 instructs the information segment IS buffer to delete the temporarily stored information segment IS and identifier TAG.

The method of dividing the information file into information segment IS and giving the identifier TAG is the same as the method described in FIGS. 5-7, and the identifier TAG is the same as that described in FIG. 8.

Information segment IS buffer 170 temporarily stores the information segment IS and identifier TAG generated by information processing section 130, and based on the instruction from information processing section, sends and/or deletes the temporarily stored information segment and identifier TAG toward information processing section 130.

Information transmitting and receiving section 140 is for example a wireless communication device connected to a PC, which transmits the encrypted identifier TAG sent from information processing section 130, or a set of encrypted information segment IS and the identifier TAG toward information receiving device 200, and in addition, receives signals, sent from information receiving device 200. Detailed explanation regarding the transmitting and receiving of the signals will be given by using FIG. 13.

Also in the present second embodiment, communication method of information transmitting and receiving section 140 will be described by using the USB (Ultra Wide Band) which is preferably used for a high-speed large-capacity communication in a small area; however the USB is not essential and a wireless LAN or a wireless communication such as Bluetooth may be used. Further, light communication of IrDA or communication by wired LAN may be used.

Configurations and behaviors of the other part is the same as that described in FIG. 2.

Since the configuration of information receiving device 200 of the second embodiment of the present invention is substantially same as that shown in FIG. 3 except for the point of transmitting/receiving protocol, the explanation will be omitted. The transmitting/receiving protocol can be changed according to a control program.

Next, the transmitting and receiving operations between information transmitting device 100 and information receiving device 200, will be described by using FIG. 13. FIG. 13 is a schematic diagram showing a transmitting/receiving protocol of encrypted information segment IS and identifier TAG between the information transmitting device 100 and the information receiving device 200.

Figure 13:
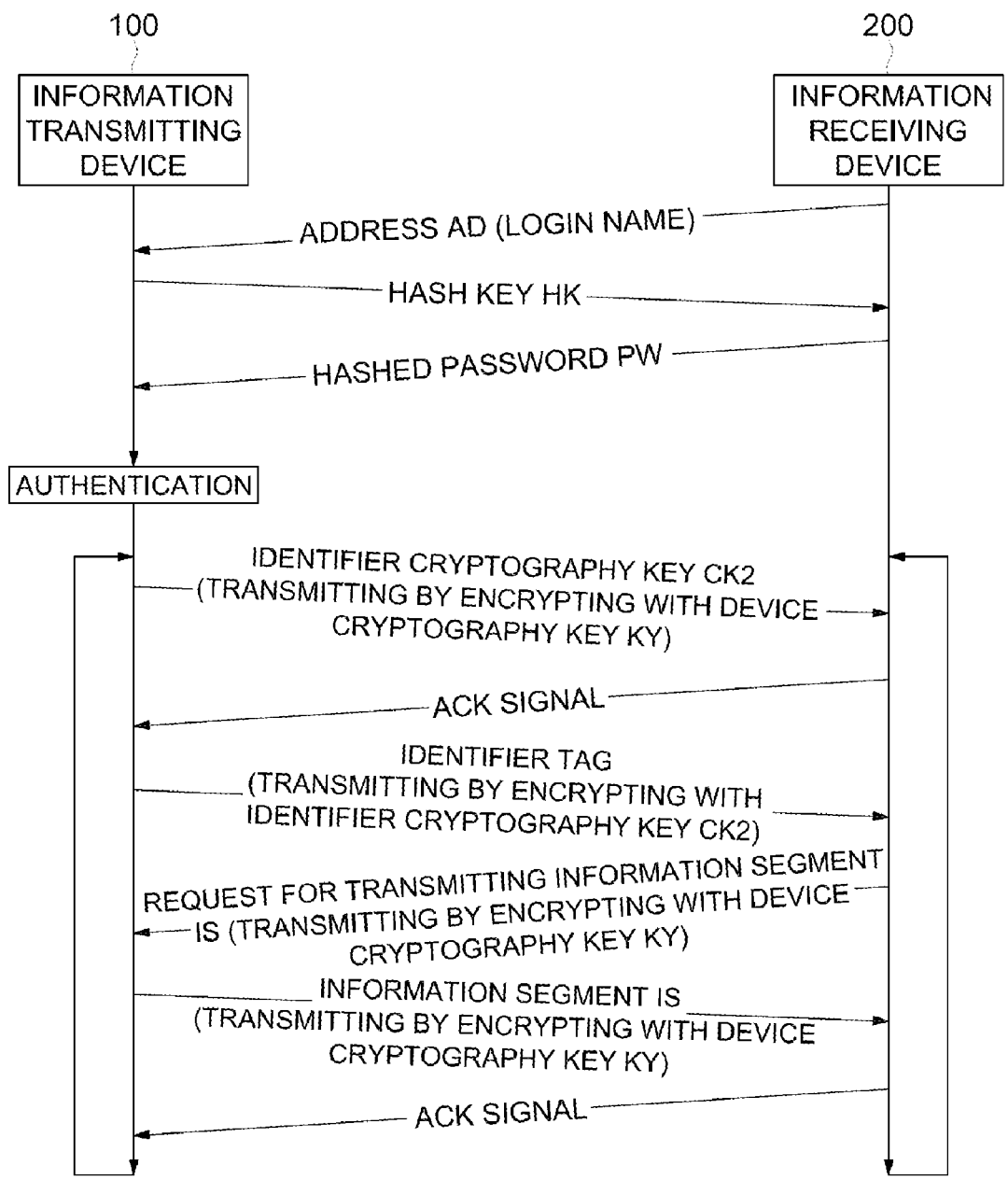
FIG. 13 is a schematic diagram showing a transmitting/receiving protocol of encrypted information segment and identifier between the information transmitting device and the information receiving device.

In FIG. 13, until information transmitting device 100 authenticates information receiving device 200 by using the hash key HK, the process is same as that shown in FIG. 10, accordingly, the explanation will be omitted.

Information transmitting device 100 delivers identifier cryptography key CK2 for encrypting the identifier TAG toward the authenticated information receiving device 200, after encrypting by using the device cryptography key exclusive to said information receiving device 200 and stored in information receiving device data base 150. Although the identifier TAG cryptography key CK2 is common to all the authenticated information receiving device 200, since the key CK2 is sent after being individually encrypted for each authenticated information receiving device 200, it will not flow out to any unauthenticated information receiving device 200.

Identifier TAG cryptography key CK2 is updated every after all information segment IS being transmitted, and similarly to described above, is transmitted from information transmitting device 100 to every information receiving device 200 after individually encrypted for each information receiving device 200. The information receiving device 200 having received the encrypted identifier TAG cryptography key CK2 sends Ack signal for receipt confirmation toward the information transmitting device 100.

If the Ack signal cannot be received from certain information receiving device 200 or a signal level of the Ack signal is lower than a prescribed level, the information transmitting device 100 makes the authentication of the information device 200 invalid. The information receiving device 200, whose authentication is made invalid, needs to place the abovementioned login request again and to get authentication. Without getting the authentication, the information receiving device cannot login or receive the identifier TAG cryptography key CK2 from the information transmitting device 100, thus cannot decode the identifier TAG.

The information receiving device 200 also does not send back the Ack signal when receiving the encrypted identifier TAG cryptography key CK2, if the signal level from the information transmitting device 100 is lower than a prescribed level. Thus, similarly to the abovementioned, the authentication of information receiving device 200 by information transmitting device 100 is made invalid, which requires another login.

The information transmitting device 100 transmits identifier TAG cryptography key CK2 individually to all the authenticated information receiving devices 200, and after receiving the Ack signal from every information receiving device 200, transmits identifier TAG encrypted by the identifier TAG cryptography key CK2 toward all the authenticated information receiving devices 200. The identifier TAG encrypted by the identifier TAG cryptography key CK2, sent at this time, is common to all the authenticated information receiving devices 200, therefore, each information receiving device 200 does not send back the Ack signal.

In a case where there is an information file which became not required to read by information receiving device 200, by deleting the information file from information recording section 110 of information receiving device 200 or by prohibiting information reading section 120 from reading out the information file out of information recording section 110, information transmitting and receiving section 140 is prevented from transmitting said information file. Thereafter, said information file cannot be read on information receiving device 200.

After receiving the identifier TAG encrypted by the identifier TAG cryptography key CK2, each information receiving device 200 determines the information segment IS desired to read based on the identifier TAG extracted by the method being described later in FIG. 14, and sends toward information transmitting device 100 a request for transmitting the information segment IS, the request being encrypted with the device cryptography key KY.

After receiving the transmitting request from information receiving device 200, the information transmitting device 100 delivers the requested information segment IS, individually to each information receiving device 200 requesting the information segment IS, by encrypting with the device cryptography key KY exclusive to each information receiving device 200. After receiving the encrypted information segment IS, the information receiving device 200 sends the Ack signal for receipt confirmation toward the information transmitting device 200. Determination of validity of the authentication made by using the Ack signal is executed similarly to the abovementioned.

The information transmitting device 100 delivers all the identifiers TAG, which are needed to be sent, within a predetermined first period of time. After finishing the transmission of all the identifiers TAG, the operations explained by FIG. 13 are repeated before the previously determined first time period elapses from the time of starting the transmission of the previous identifier TAG. In cases where all the identifiers TAG required to send cannot be sent within the predetermined first period of time, setting of the first period of time is previously changed. It is possible that the first period of time is changed as needed according to the communication between information transmitting device 100 and information receiving device 200.

Although, in the system of the first embodiment, information segment IS is sent by each information file, in the second embodiment the information file is preliminary divided and converted to information segments IS, and is stored in information segment buffer 170, which does not necessitate the transmission of information segment IS by the unit of information file. Therefore, all the information segments IS needed to be sent are shuffled and transmitted by random order, for example.

By the above, in cases where an authentication become invalid because information receiving device 200 being unable to receive transmission signals from information transmitting device 100, for example, by leaving from the conference room, the information of the higher priority is erased in the shorter time period, thus, further improvement of security can be realized.

Figure 14:
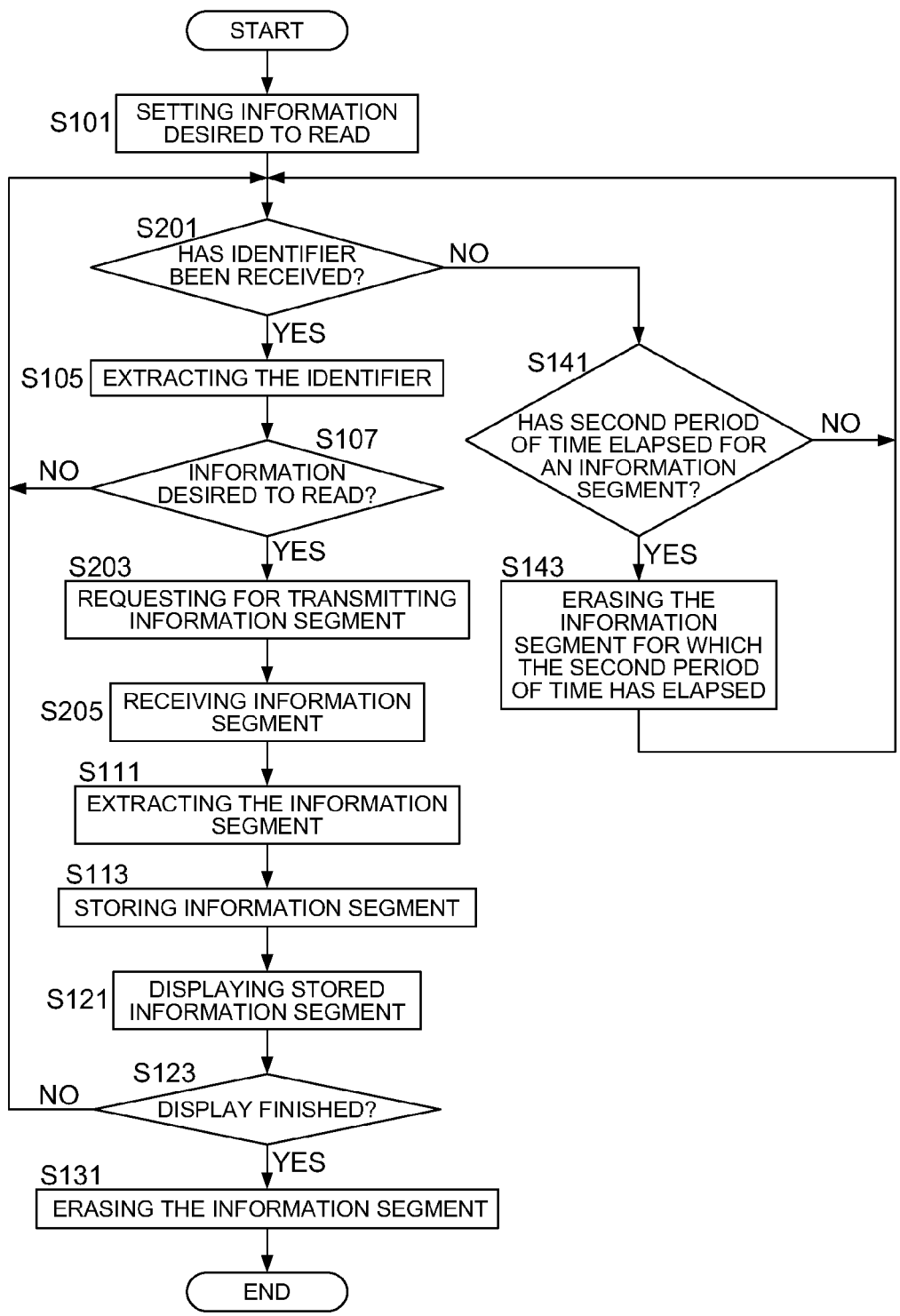
FIG. 14 is a flow chart showing an example of a method of receiving an information segment desired to read, and reading the information received.

Next, the method of receiving and viewing the information segment IS desired to read with information receiving device 200 is described by the use of FIG. 14. FIG. 14 is a flow chart showing an example of a method of receiving an information segment IS desired to read, and reading the information received, by using information receiving device 200. As for the common step with FIG. 11, the same step number is given and the detailed description is omitted.

In FIG. 14, as in FIG. 11, at step S101 display operation section 260 is operated by a user, and a part (page or a portion in a page) desired to read in conference information and the like is selected and set up. In step S201, confirmed is whether any identifier TAG is received by information receiving device 200, among a bundle of all identifiers TAG encrypted and sequentially transmitted from information transmitting device 100. If received (step S201; Yes), the secret code of the received signal is decoded and identifier TAG is extracted in step S105 and the process proceeds to step S107.

If not received, (step S201; No), confirmed in step S141 is whether there is an information segment IS for which a predetermined second period of time has elapsed in information storing section 230. The second period of time is determined to be same as or longer than the predetermined first period of time explained in FIG. 13. It is also possible that the second period of time is changed as needed according to the communication between information transmitting device 100 and information receiving device 200. In a case where there is no information segment IS for which the predetermined second period of time has elapsed (step S141; No), the process returns to step S 201, and repeats step S 201 and step S141 and waits until any identifier TAG is received.

In a case where there is an information segment IS for which a predetermined second period of time has elapsed (step S141; Yes), namely, in a case where the identifier TAG of said information segment IS is not received within the second period of time, in step S143, contents stored in information storing section 230 is erased, and the process return to step S201. Thus, the display of information segment IS is stopped.

In step S107, confirmed is whether identifier TAG extracted at step S105 is the identifier TAG given to the information segment IS including the part desired to read which having been selected by the user at step S101. If not it is not the identifier TAG given to the information segment IS including the part desired to read (step S107; No), the process returns to step S201 and after receiving next identifier TAG, the above described operations are repeated.

If it is the identifier TAG given to the information segment IS including the part desired to read (step S107; Yes), request for transmitting information segment IS indicated by the identifier TAG received at step S201 is transmitted by encrypting from information receiving device 200 to information transmitting device 100.

However, even if the identifier TAG presently extracted at step S105 is the identifier TAG given to information segment IS including the part desired to read, in cases where this identifier TAG is same as the identifier TAG already stored in information storing section 230, since the information segment IS including the part desired to read have been already stored in the information storing section 230, the request for transmitting the information segment IS of step S203 needs not be executed and the process may return to step S201.

In step S205, received is the encrypted information segment IS transmitted from information transmitting device 100. In step S111, secret codes of the received signals are decoded and the information segment IS is extracted. As the steps from step S113 to sep S131 are same as those in FIG. 11, the description is omitted.

As described above, according to the second embodiment of the present invention, by providing an information transmitting and receiving system configured with: an information transmitting device which, differently from the first embodiment, firstly transmits only a bundle of identifiers TAG to a limited area repeatedly within a first period of time, and transmits information segment IS in response to a request from an information receiving device; and an information receiving device which requests the transmission of information segment IS desired to read from the received information TAG, and displays the information segment IS desired to read, and if the identifier TAG given to the information segment IS cannot be received within a second period of time, stops displaying of the information segment IS; it becomes possible to realize an information transmitting and receiving system, an information transmitting device, and an information receiving device where confidential information outflow is prevented and the information desired to read can be freely viewed at the place in a highly confidential conference etc., since unnecessary information segment IS needs not be sent and the information desired to read can be freely viewed in a limited place and in a limited time period.

As described above, according to the present invention, by providing an information transmitting and receiving system configured with: an information transmitting device which repeatedly transmits identifiers given to information within a first period of time; and an information receiving device which displays the received information and if the identifier given to the information cannot be received within a second period of time, stops displaying of the information, it becomes possible to provide an information transmitting and receiving system, an information transmitting device, and an information receiving device where confidential information outflow is prevented and the information desired to read can be freely viewed at the place in a highly confidential conference etc., since the information desired to read can be freely viewed in a limited place and in a limited time period.

With respect to detailed configurations and detailed operations of each structure composing the image transmitting device, the image receiving device and the image transmitting and receiving system relating to the present information, it is possible to be changed properly without departing from the purport of the present invention.

What is claimed is:

1. An information transmitting and receiving system comprising an information transmitting device for transmitting information, and information receiving device for receiving and displaying the information transmitted from the information transmitting device, wherein the information transmitting device comprises:
   an information reading section which reads out information recorded in an information recording section;
   an information processing section which divides the information read out from the information reading section into a plurality of information segments, and gives an identifier uniquely to each divided information segment, said unique identifier including information related to the divided information segment's position within the information read out from the information recording section; and an information transmitting section which repeatedly transmits a bundle of identifiers including the unique identifiers within a first period of time, wherein the information receiving device comprises:

an information receiving section which receives the bundle of identifiers transmitted from the information transmitting device;

an information selecting section which selects an information segment desired to read from the plurality of information segments:

an information storing section which receives from the information transmitting device and stores the information segment desired to read having been selected by the information selecting section;

an information display section which displays the information segment desired to read having been stored in the information storing section; and a display control section which controls the information display section, wherein the display control section controls the information display section such that in a case where the information receiving section does not receive the unique identifier given to the information segment desired to read within a second period of time, the information display section stops displaying the information segment desired to read stored in the information storing section.

2. The information transmitting and receiving system described in claim 1, wherein the information transmitting device repeatedly transmits a bundle of information segments together with the bundle of identifiers within the first period of time.

3. The information transmitting and receiving system described in claim 1, wherein the information receiving device transmits a request of transmission of the information segment desired to read, and the information transmitting device transmits the information segment desired to read in response to the request of transmission from the information receiving device.

4. The information transmitting and receiving system described in claim 1, wherein the information transmitting device comprises an information receiving device data base in which information regarding the information receiving device is recorded, the information transmitting device executes authentication of the information receiving device based on the information regarding the information receiving device, and transmits the information segment to the authenticated information receiving device via communication.

5. The information transmitting and receiving system described in claim 1, wherein the second period of time is equal to or longer than the first period of time.

6. The information transmitting and receiving system described in claim 1, wherein the information transmitting device transmits, by encrypting, the information segment and the unique identifier.

7. The information transmitting and receiving system described in claim 1, wherein the communication between the information transmitting device and the information receiving device is executed via wireless transmission.

8. An information transmitting device for transmitting information to be displayed by an information receiving device, comprising:

an information reading section which reads out information recorded in an information recording section;

an information processing section which divides the information read out from the information recording section by the information reading section into a plurality of information segments, and gives an identifier uniquely for each divided information segment, said unique identifier including information related to the divided information segment's position within the information read out from the information recording section; and an information transmitting section which repeatedly transmits a bundle of identifiers including the unique identifiers within a first period of time;

wherein in a case where the information receiving device does not receive the unique identifier given to the information segment desired to read within a second period of time, the information receiving device stops displaying the information segment desired to read stored in the information storing section.

9. An information transmitting device for transmitting information to be displayed by an information receiving device, comprising:

an information reading section which reads out information recorded in an information recording section;

an information processing section which divides the information read out from the information recording section by the information reading section into a plurality of information segments, and gives an identifier uniquely to each divided information segment, said unique identifier including information related to the divided information segment's position within the information read out from the information recording section; and an information transmitting section which in addition to repeatedly transmit via communication a bundle of identifiers including the unique identifiers within a first period of time, transmits the information segment for which a request for transmission is received from the information receiving device.

10. An information receiving device for displaying information transmitted from an information transmitting device, comprising:

an information receiving section which receives via communication a bundle of a plurality of information segments obtained by dividing the information and identifiers, each of the identifiers being uniquely given to each of the plurality of information segments, said unique identifier including information related to the information segment's position within the information transmitted by the information transmitting device;

an information selecting section which selects an information segment desired to read from the bundle of the information segments and the identifiers received by the information receiving section based on the identifiers:

an information storing section which stores the information segment desired to read having been selected by the information selecting section;

an information display section which displays the information segment desired to read having been stored in the information storing section; and a display control section which controls the information display section, wherein the display control section controls the information display section such that in a case where the information receiving section does not receive the identifier given to the information segment desired to read within a second period of time, the information display section stops displaying the information segment desired to read stored in the information storing section.

11. An information receiving device for displaying information transmitted from an information transmitting device, provided with:
- a first information receiving section which receives via communication a bundle of identifiers each of the identifiers being uniquely given to each of information segments obtained by dividing the information, said unique identifiers including information related to the information segment's position within the information transmitted by the information transmitting device;
- an information selecting section which selects an information segment desired to read from the information segments;
- a second information receiving section which transmits a request for transmission of the information segment desired to read having been selected by the information selecting section, and receives the information segment desired to read;
- an information storing section which stores the information segment desired to read having been received by the second information receiving section;
- an information display section which displays the information segment desired to read having been stored in the information storing section; and
- a display control section which controls the information display section,
- wherein the display control section controls the information display section such that in a case where the first information receiving section does not receive the identifier given to the information segment desired to read within a second period of time, the information display section stops displaying the information segment desired to read stored in the information storing section.

* * * * *